Patented Aug. 8, 1950

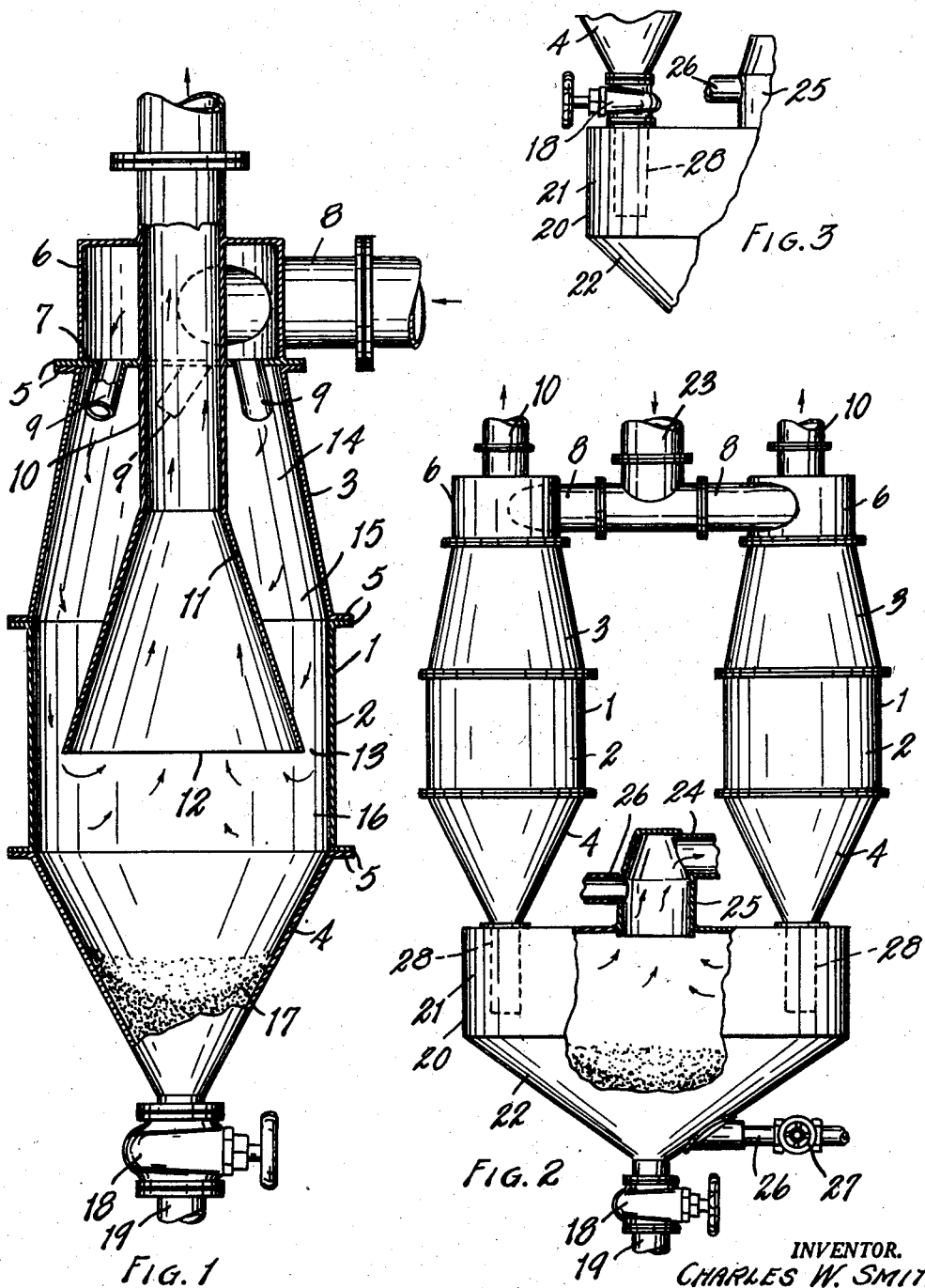

2,518,084

UNITED STATES PATENT OFFICE 2,518,084

APPARATUS FOR SEPARATING RELATIVELY HEAVY PARTICLES FROM LIQUID

Charles W. Smith, Muskegon, Mich.

Application July 23, 1945, Serial No. 606,578

7 Claims. (Cl. 92—28)

The main objects of this invention are:

First, to provide a separator which is well adapted for separating sand and other heavy or foreign particles from paper pulp in liquid condition—that is, suspended or mixed with water to a substantially fluid condition and an apparatus which is efficient and compact and of very large capacity in proportion to the size thereof.

Second, to provide a separator apparatus in which the parts are very simple and cannot become clogged in use if reasonable care is given to clean out the collected heavy materials.

Third, to provide an apparatus having these advantages which requires a minimum of attention and is very durable in use.

Objects relating to details and economies of the invention will appear from the description to follow. The invention is defined and pointed out in the claims.

Preferred embodiments of the invention are illustrated in the accompanying drawing, in which:

Fig. 1 is a fragmentary view mainly in vertical section of a separator chamber or unit embodying my invention.

Fig. 2 is a fragmentary side elevation of an apparatus comprising a pair of units shown in Fig. 1 with an auxiliary separator chamber common to both.

Fig. 3 is a fragmentary side elevation of another modification or embodiment of my invention.

I will first describe the single unit or separator chamber designated generally by the numeral 1. In the embodiment illustrated, the separator chamber has an intermediate cylindrical wall portion 2, an upwardly tapered upper portion 3 and a downwardly tapered lower wall portion 4. The meeting edges of these portions are provided with flanges 5 which may be secured together by bolts or spot welding means not illustrated but it will be understood that they are secured together to make a closed joint.

The inlet chamber 6 is provided with a bottom 7 constituting a top for the separator chamber, this inlet chamber having a flange portion 5 corresponding to a similar flange on the end of the upper section 3. The stock inlet 8 delivers tangentially to this inlet chamber to impart a centrifugal motion to the entering stock. The inlet chamber is preferably provided with tubular discharge nozzles 9 which extend into the separator chamber and are inclined to discharge the stock with downward and outward centrifugal swirling motion.

The discharge pipe 10 is disposed centrally through the inlet chamber to depend into the separator chamber and has a downwardly flaring lower portion 11 of substantial length. The lower edge 12 of this lower portion is disposed adjacent the cylindrical wall 2 to provide an annular throat 13 at this point. With the parts thus arranged, the walls of the chamber and the discharge pipe coact to provide an upper downwardly expanding chamber 14 merging into a downwardly contracting section 15 which terminates in the restricted throat 13 and below this throat the chamber section 16 is relatively enlarged and unobstructed. The incoming stock is discharged into the separator chamber with a swirling centrifugal motion and the heavy particles are thrown outwardly and travel downwardly along the walls to be collected as indicated at 17 in Fig. 1.

The structure permits the introducing of the stock at relatively low speed thereby requiring relatively little power in the delivery thereof. The stock is discharged into the separator chamber with a downward and outward directional velocity and at a point below the edge of the conical portion 11 of the discharge pipe. A change in speed and direction takes place which results in the discharge of the heavier particles or precipitation thereof so that they settle to the bottom of the separator as shown at 17.

My improved separator is effective in the discharge or separation of heavier particles or foreign matter from the paper stock even though there is a very considerable change in the consistency of the stock. Another desirable feature is that the apparatus does not become clogged and the flow of stock therethrough tends to prevent clogging although it will be noted that there are no corners or recesses in the stock passage. By directing the entering stock downwardly and outwardly in a centrifugal flow, the heavier particles are thrown outwardly and tend to move down along the wall of the chamber so that they are not likely to be picked out and carried out with the discharged stock. A restricted throat at the point of discharge increases the velocity of the liquid and this further acts to precipitate the discharge of the heavier particles from the current.

A clean-out valve 18 is provided in the bottom of the chamber, this delivering to a conduit 19. The stock discharge or outlet pipe may be connected to a suitable storage or stock tank.

In Fig. 2, I illustrate an apparatus comprising a pair of separator chambers 1, these both delivering to the top of the auxiliary separator chamber 20 comprising a cylindrical top portion 21 and a downwardly tapered bottom or lower portion 22. The main separator chambers have restricted discharges to the chamber 20—that is, restricted relative to the outlet or discharge pipe 10 of the main separator chambers. In this embodiment, the stock inlets 8 are connected to a common source of supply 23. The separator chambers are preferably provided with discharge conduits 28 which project well into the separator chamber 20 so that the material is discharged well toward the bottom thereof preventing direct cross flow to the outlet 24. The outlet 24 is connected to the top of the chamber 20 by a relatively enlarged coupling 25 constituting an outlet chamber. A water pipe 26 is connected to the side of this coupling for supplying water to the outflowing stock for the purpose of diluting it. A water supply pipe 26 is connected to the separator chamber 20 adjacent the bottom thereof for the purpose of washing out the sediment through the discharge pipe 19 controlled by a valve 18 corresponding to the parts 18 and 19 of Fig. 1.

In the embodiment shown in Fig. 3, the valve 18 is interposed in the connection for the separator chamber 4 to the auxiliary chamber 20.

The embodiment shown in Fig. 2 is not only designed to provide a unit of increased capacity as compared to the single unit of Fig. 1 but also some fiber may be trapped with the sand and other heavy material collected in the main separators and this is discharged into the second or auxiliary separator to be further treated by addition of water. It is not intended that the stock or material discharged from the auxiliary chamber shall be mixed with the clean stock discharged from the main separator as the stock discharged from the main separator is ready for use—that is, without further cleaning whereas the stock or material discharged from the auxiliary chamber should be again treated by passing through another separator unit preferably after diluting it with water.

My improved separator apparatus is highly efficient and of very large capacity in proportion to size and is durable and does not become clogged and requires a minimum of attention on the part of the operator. The clean-out should be opened at proper intervals, otherwise the material collected would be washed into the outlet.

I have not attempted to illustrate or describe other embodiments or adaptations which I contemplate as it is believed that this disclosure will enable those skilled in the art to embody or adapt my invention as may be desired. I have not, in the accompanying drawing, shown a supporting frame as it will be readily understood and this is varied considerably according to the particular installations.

Having thus described my invention, what I claim as new and desire to secure by Letters Patent is:

1. An apparatus for separating relatively heavy and fine particles from liquids comprising a vertical separator chamber having an intermediate cylindrical wall portion, an upper upwardly tapered wall portion and a lower downwardly tapered wall portion, an inlet chamber having a cylindrical side wall, the bottom of said chamber constituting the top of said separator chamber, said inlet chamber having a tangentially directed liquid inlet and a plurality of tubular discharge nozzles depending in an inclined direction into said separator chamber, a discharge pipe disposed centrally through said inlet chamber and through the top and bottom walls thereof and depending centrally into said separator chamber, said discharge pipe having a downwardly flaring lower portion of substantial length disposed with the upper flaring portion thereof extending for a substantial distance into the upwardly tapered wall portion of the separator chamber and disposed with its mouth centrally within the intermediate cylindrical wall portion of said chamber and in such relation to the wall thereof as to provide an annular relatively restricted throat between the upper portion of the chamber and the portion thereof below the mouth of said discharge pipe, said discharge pipe constituting a continuously closed passageway from the lower end of the flaring portion thereof to and through the top wall of said inlet chamber, said downwardly flaring lower portion extending flaringly outwardly for a substantial vertical distance and to relatively close the surrounding separator chamber wall to gradually force the liquid outwardly toward said wall as the liquid moves downwardly through the separator chamber, the said discharge nozzles being inclined to impart a downwardly and outwardly directed spiral centrifugal action to the downwardly flowing liquid, the walls of said separator chamber and said discharge pipe coacting to provide an upper downwardly expanding chamber section merging into an intermediate downwardly contracting section terminating in said restricted throat and a relatively enlarged and unobstructed settling portion below the mouth of said discharge pipe, said discharge pipe and the walls of the separator chamber confining the entire flow of the stock to a generally gradual outward movement from substantially the lower ends of said discharge nozzles to adjacent the lower end of the outwardly flaring portion of the discharge pipe, the width of the lower end of said flaring portion being relatively large as compared to the width of said restricted throat whereby the flaring portion effects a relatively large unobstructed settling portion beneath and within the same, and a clean-out valve at the bottom of said separator chamber.

2. An apparatus for separating relatively heavy particles from liquids comprising a vertical separator chamber having a cylindrical intermediate portion, an upwardly tapered upper portion and a downwardly tapered lower portion, an inlet chamber above said upper portion having downwardly inclined passageways discharging liquid to said separator chamber with a spiral centrifugal downward direction, and inlet chamber having top and bottom walls, and a discharge pipe depending centrally into said separator chamber and through the top and bottom walls of the inlet chamber, said discharge pipe having a downwardly flaring lower portion of substantial length disposed with the upper flaring portion thereof extending for a substantial distance into the upwardly tapered wall portion of the separator chamber and disposed with its mouth centrally within the cylindrical intermediate portion of said chamber and in such relation to the wall thereof as to provide an annular relatively restricted throat between the portion of the chamber above and the portion of the chamber below the mouth of said discharge pipe, said discharge pipe constituting a continuously closed passageway extending from the lower end of its flaring portion to and through the top wall of said inlet chamber, said downwardly flaring lower portion extending flaringly outwardly for a substantial vertical distance and to relatively close the surrounding separator chamber wall to gradually force the liquid outwardly toward said wall as the liquid moves downwardly through the separator chamber, the walls of said chamber and said discharge pipe coacting to provide an upper downwardly expanding chamber section merging into an intermediate downwardly contracting section terminating in said restricted throat and a relatively enlarged and unobstructed settling portion below the mouth of said discharge pipe, said discharge pipe and the walls of the separator chamber confining the entire flow of the stock to a generally gradual outward movement from substantially the lower ends of said inclined passage ways to adjacent the lower end of the outwardly flaring portion of the discharge pipe, the width of the lower end of said flaring portion being relatively large as compared to the width of said restricted throat whereby the flaring portion effects a relatively large unobstructed settling portion beneath and within the same.

3. A separator apparatus of the class described comprising, a vertical separator chamber having a cylindrical intermediate portion, an upwardly tapered upper portion and a downwardly tapered lower portion, said tapered upper portion having an upper closing wall, means including downwardly and outwardly inclined nozzles for delivering stock from above said wall to the upper end of said chamber with a downwardly and outwardly directed centrifugal motion whereby the heavier particles are carried outwardly, and a discharge pipe depending centrally into said separator chamber, said discharge pipe having a downwardly flaring lower portion of substantial length disposed with the upper flaring portion thereof extending for a substantial distance into the upwardly tapered wall portion of the separator chamber and disposed with its mouth centrally within the cylindrical intermediate portion of said chamber and in such relation to the wall thereof as to provide an annular relatively restricted throat between the portion of the chamber above and the portion of the chamber below the mouth of the discharge, said downwardly flaring lower portion extending flaringly outwardly for a substantial vertical distance and to relatively close the surrounding separator chamber wall to gradually force the liquid outwardly towards said wall as the fluid moves downwardly through the separator chamber, said discharge pipe and the walls of the separator chamber confining the entire flow of the stock to a generally gradual outward movement from substantially the upper end of said separator chamber to adjacent the lower end of the outwardly flaring portion of the discharge pipe, the width of the lower end of said flaring portion being relatively wide as compared to the width of said restricted throat whereby the flaring portion effects a relatively large unobstructed settling portion beneath and within the same.

4. A separator apparatus for paper stock and the like comprising a vertical separator chamber of circular section, and having a closing wall at the upper end thereof and a discharge pipe disposed centrally within said chamber and having a downwardly flaring lower end portion disposed with its edge in spaced relation to the wall of the chamber and to provide a relatively restricted throat, said discharge pipe constituting a continuously closed passageway extending through said closing wall to the lower end of the downwardly flaring portion, means including tubular nozzles inclined downwardly from said closing wall into the separator chamber for delivering stock to be treated to the top of said chamber with a centrifugal flow, said discharge pipe coacting with the chamber walls to provide a downwardly expanding section at the upper end of the separator chamber, a downwardly contracting section adjacent the lower end of the discharge pipe, and an unobstructed portion below the discharge pipe, said downwardly flaring lower portion extending flaringly outwardly for a substantial vertical distance and to relatively close the surrounding separator chamber wall to gradually force the liquid outwardly toward said wall as the liquid moves downwardly through the separator chamber, said discharge pipe and the walls of the separator chamber confining the entire flow of the stock to a generally gradual outward movement from substantially the upper end of said separator chamber to adjacent the lower end of the outwardly flaring portion of the discharge pipe, the width of the lower end of said flaring portion being relatively wide as compared to the width of said restricted throat whereby the flaring portion effects a relatively large unobstructed settling portion beneath and within the same.

5. A separating apparatus of the class described comprising in combination a plurality of main separators, each comprising a vertical separator chamber, means for delivering stock to the upper end of said chamber with a centrifugal motion, a discharge pipe depending centrally into said separator chamber with its lower end in spaced relation to the surrounding wall of the chamber to provide an annular relatively restricted throat between the portion of the chamber above and the portion of the chamber below the lower end of the discharge pipe, the chamber being unobstructed for a substantial distance below the lower end of the said discharge pipe to provide a relatively large settling portion with a result that the speed of flow of the stock is accelerated as it is discharged through said throat into said settling portion of the chamber and the speed of flow substantially reduced as the stock with the heavy particles removed enters the discharge pipe, an auxiliary separator chamber, said main separator chambers having other discharge pipes depending substantially into said auxiliary chamber, and a discharge outlet chamber at the top of said auxiliary chamber opening at the lower end thereof directly into said auxiliary chamber and provided with means for introducing diluting water to the material discharged from the top of said auxiliary chamber without passage of the diluting water through said auxiliary chamber, the discharge ends of said other discharge pipes being disposed at a substantial distance below the level of said discharge outlet chamber to facilitate deposit of sand and heavy particles at the bottom of the auxiliary chamber before passage of the stock from said discharge outlet chamber.

6. A separating apparatus of the class described comprising in combination a plurality of main separators, each comprising a vertical separator chamber, means for delivering stock to the upper end of said chamber with a centrifugal motion, a discharge pipe depending centrally into said separator chamber with its lower end in spaced relation to the surrounding wall of the chamber to provide an annular relatively restricted throat between the portion of the chamber above and the portion of the chamber below the lower end of the discharge pipe, the chamber being unobstructed for a substantial distance below the lower end of the said discharge pipe to provide a relatively large settling portion with a result that the speed of flow of the stock is accelerated as it is discharged through said throat into said settling portion of the chamber and the speed of flow substantially reduced as the stock with the heavy particles removed enters the discharge pipe, an auxiliary separator chamber to which said main separator chambers deliver, and a discharge outlet at the top of said auxiliary chamber provided with means for introducing diluting water to the material discharged from the top of said auxiliary chamber without passage of said diluting water through said auxiliary chamber.

7. A separating apparatus of the class described comprising in combination a plurality of main separators, each comprising a vertical separator chamber, means for delivering stock to the upper end of said chamber with a centrifugal motion, a discharge pipe depending centrally into said separator chamber with its lower end in spaced relation to the surrounding wall of the chamber to provide an annular relatively restricted throat between the portion of the chamber above and the portion of the chamber below the lower end of the discharge pipe, the chamber being unobstructed for a substantial distance below the lower end of the said discharge pipe to provide a relatively large settling portion with a result that the speed of flow of the stock is accelerated as it is discharged through said throat into said settling portion of the chamber and the speed of flow substantially reduced as the stock with the heavy particles removed enters the discharge pipe, an auxiliary separator chamber, said main separator chamber having relatively restricted discharge connections to said auxiliary chamber, and a centrally disposed discharge at the top of said auxiliary separator chamber, said restricted discharge connections delivering to said auxiliary chamber at a substantial distance below the level of said discharge at the top of the auxiliary chamber to facilitate deposit of sand and heavy particles from the stock before passage from said discharge.

CHARLES W. SMITH.

REFERENCES CITED

The following references are of record in the file of this patent:

UNITED STATES PATENTS

| Number | Name | Date |
|---|---|---|
| 458,550 | Kutsche | Aug. 25, 1891 |
| 2,098,608 | Berges | Nov. 9, 1937 |
| 2,312,706 | Freeman | Mar. 2, 1943 |
| 2,364,405 | Trimbey et al. | Dec. 5, 1944 |
| 2,378,632 | Hooker et al. | June 19, 1945 |
| 2,379,411 | Berges | July 3, 1945 |